United States Patent [19]
Makino et al.

[11] Patent Number: 4,622,470
[45] Date of Patent: Nov. 11, 1986

[54] SHUTTER CONTROL SYSTEM

[75] Inventors: Junzo Makino; Akira Yamada, both of Tokyo, Japan

[73] Assignee: RCA Corporation, Princeton, N.J.

[21] Appl. No.: 600,820

[22] Filed: Apr. 16, 1984

[51] Int. Cl.[4] .............................. G01J 1/20; F24J 2/38
[52] U.S. Cl. ................................. 250/203 R; 126/425
[58] Field of Search ................. 250/201, 203 ST, 205, 250/204, 237 R; 126/424, 425, 419; 160/5, 7

[56] References Cited

U.S. PATENT DOCUMENTS

| | | | |
|---|---|---|---|
| 3,646,985 | 3/1972 | Klann | 160/168 |
| 3,996,917 | 12/1976 | Trihey | 126/270 |
| 4,223,174 | 9/1980 | Moeller | 136/246 |
| 4,223,214 | 9/1980 | Dorian et al. | 250/203 |
| 4,314,546 | 2/1982 | Miller | 126/425 |
| 4,334,521 | 6/1982 | Jacoby | 126/425 |
| 4,365,617 | 12/1982 | Bugash et al. | 126/425 |
| 4,396,831 | 8/1983 | Yamada et al. | 250/201 |
| 4,435,920 | 3/1984 | Osaka et al. | 49/82 |

FOREIGN PATENT DOCUMENTS 52-64647 6/1977 Japan .
55-114585 8/1980 Japan .

OTHER PUBLICATIONS

"Solar Energy", John I. B. Wilson, *The Wykeham Science Series*, Wykeham Publications, Ltd., 1979.
"Fundamentals of Solar Heating", (Published in English by the U.S. Department of Energy), Japanese translation enclosed.
"Fundamentals and Applications of Solar Energy", Prepared by Society of Solar Energy of Japan, 1978.

*Primary Examiner*—Gene Wan
*Attorney, Agent, or Firm*—Joseph S. Tripoli; William Squire

[57] ABSTRACT

A skylight shutter is driven by a battery-powered d.c. motor through transistor switches operated by Schmitt triggers. A sun sensor circuit generates a first shutter control signal so the shutter tracks the sun and passes maximum light. A room sensor circuit generates a second control signal which overrides the first control signal to reduce the room light to a desired selected level. A night sensor circuit overrides the first and second control signals for closing the shutters to minimize radiation losses during the night.

13 Claims, 6 Drawing Figures

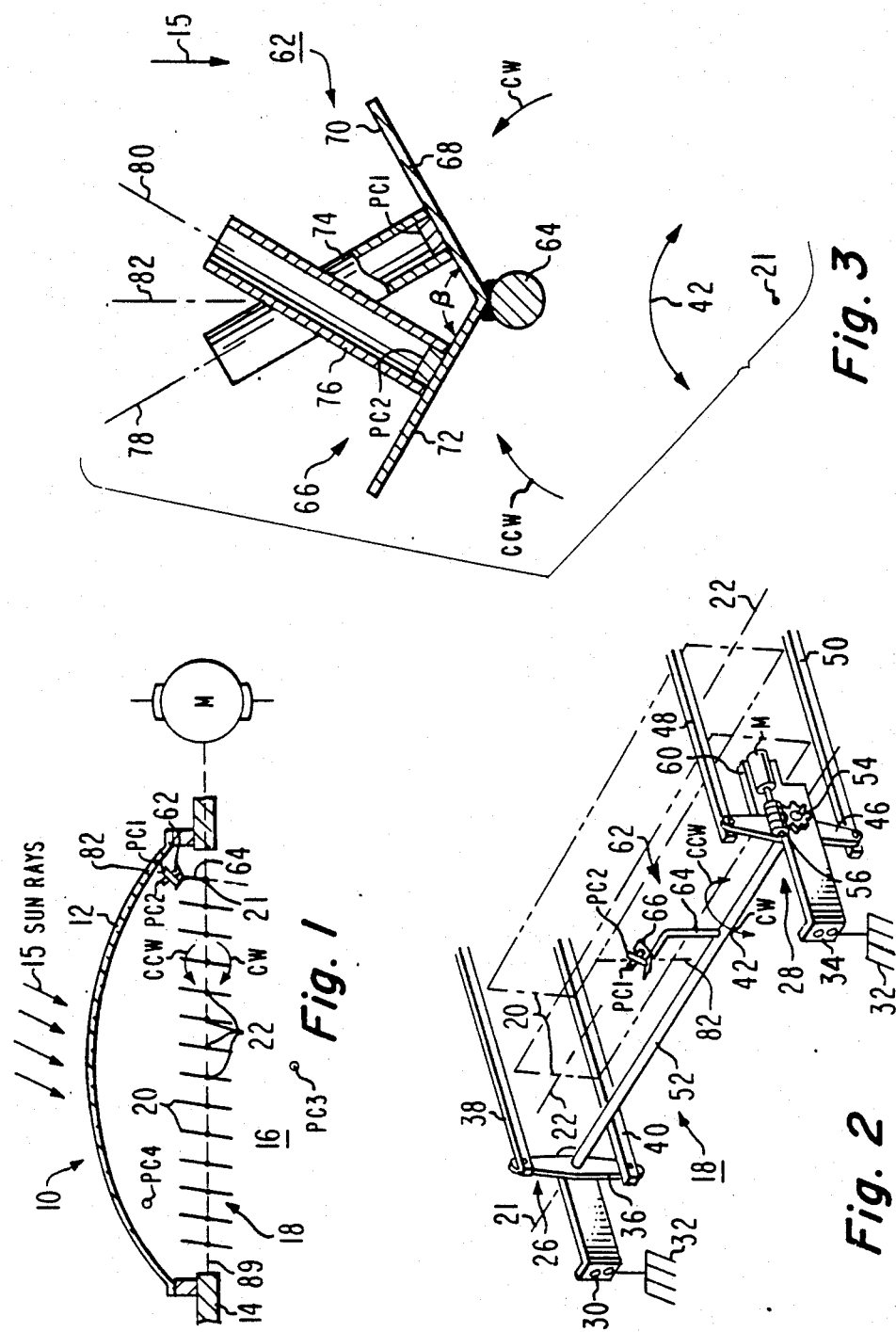

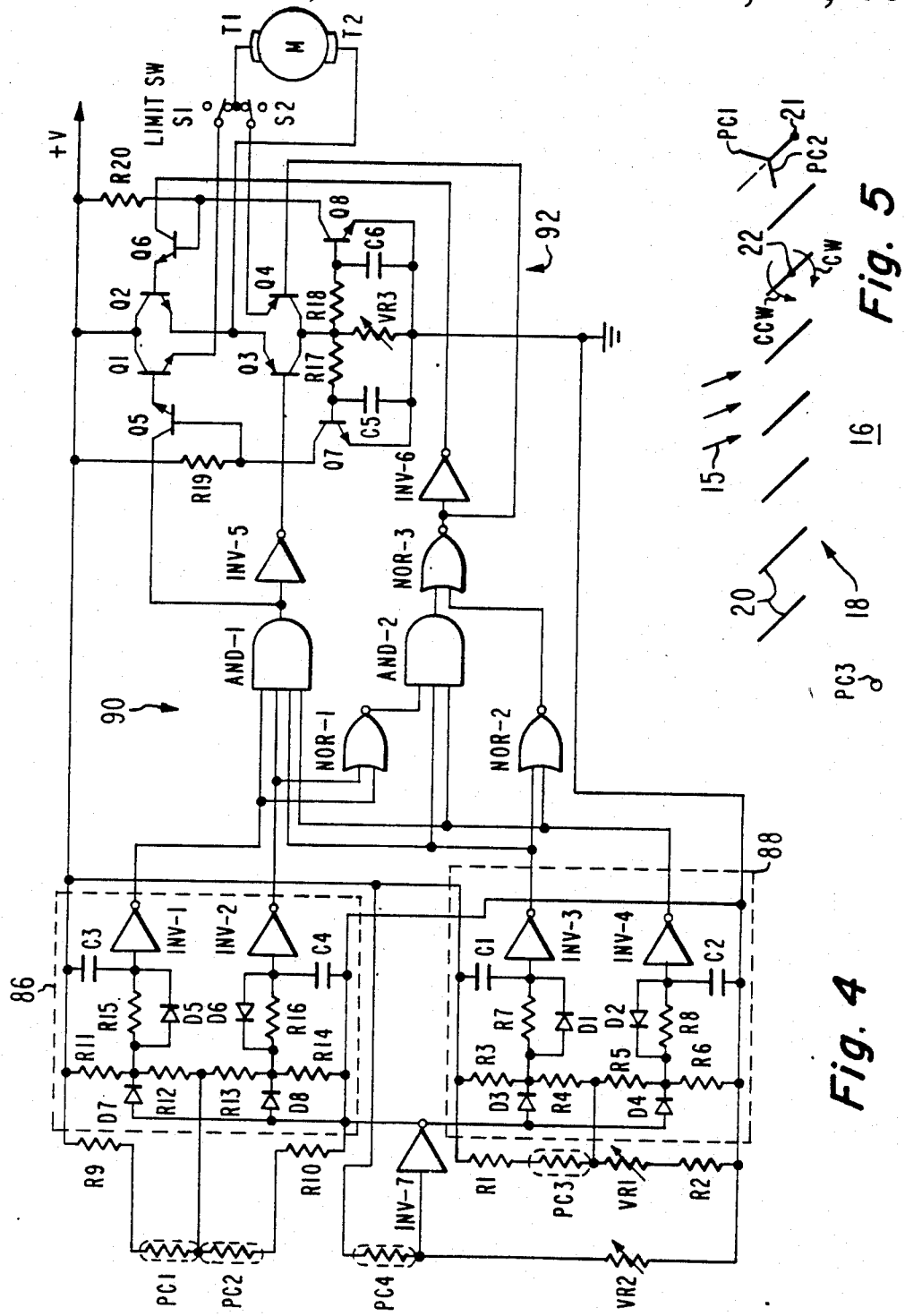

SHUTTER CONTROL SYSTEM

The present invention relates to a shutter system for controlling the light passing through a window or skylight.

In our U.S. Pat. No. 4,396,831, which is incorporated by reference herein, a shutter control system is disclosed for opening and closing a shutter in response to decreases and increases in intensity of light, respectively, passed by the shutter. The shutter control system is used to control the slats of a shutter in connection with a building opening, for example, a skylight.

A shutter which may be used with such a control system is disclosed in U.S. Pat. No. 4,435,920, which is incorporated by reference herein. In that shutter the slats are relatively broad surfaced, thin elements which rotate about parallel axes. In one orientation, the slats overlap to close the shutter; in a second orientation the slats are spaced apart to pass light therebetween. Maximum light is passed when the slats' broad surfaces are parallel to the rays of light from the light source. However, other shutters may also be used with such a control system.

The shutter may be installed in a building opening which may have any random relative orientation to the sun. That opening orientation determines the slat orientation. The slat axes of rotation, therefore, may be oriented in any compass direction. That is, the shutter structure does not inherently have a particular intended installation relative orientation to the sun.

The disclosed control system in our aforementioned patent has two operating directions, "open" and "close," which also describe their respective functions. That is, when the slats are moved in the "open" direction, the corresponding command is intended to open the slats, i.e., cause the slats to pass more light by placing their broad surfaces more parallel to the sun's rays. Also, conversely, the "close" command moves the slats in the opposite direction and is intended to close the slats, i.e., cause the slats to pass less light by placing their broad surfaces more normal to the sun's rays.

By way of example, the "close" command may move the slats' broad surfaces in a direction, for example, west to east, opposite to that of the sun's path, east to west, so that the broad slat surfaces are positioned more normal to the sun's rays during closing (by rotating the slats' maximum light passing condition from west to east). This decreases the amount of light passed as intended. If, however, the slats are placed 180° from this orientation, the "close" command may move the slats' maximum light passing condition east to west, that is, toward the sun, so that more, not less, light is passed as the slats are "closed." Conversely, if it is desired to open the slats to admit more light, it is also possible that the "open" command may "close" the slats so that less, not more, light is passed.

According to the present invention, a shutter light controlling system which controls the passed light in the desired manner regardless the relative orientation of the system to the direction of the light to be controlled comprises drive means adapted to place the shutter in a given light passing orientation in response to an applied drive input signal. First control means responsive to the light to be controlled generates a first drive means input signal to place the shutter in a first orientation at which the intensity of the light passed by the shutter is a maximum. Second control means are responsive to the intensity of light passed by the shutter for generating a second drive means input signal for overriding the first input signal to place the shutter in a second orientation in which the intensity of light passed by the shutter is at a selected value less than the maximum. Therefore, the shutter system always "knows" which way to aim the shutter slats to increase the intensity of the passed light.

In the drawing:

FIG. 1 is a sectional view through a skylight partially diagrammatic employing a shutter system in accordance with an embodiment of the present invention;

FIG. 2 is an isometric fragmented view of a portion of the shutter structure of the embodiment of FIG. 1;

FIG. 3 is a sectional elevation view through a photosensor portion of the structure of FIG. 2;

FIG. 4 is a schematic circuit diagram of one embodiment of the present invention;

FIG. 5 is a diagram useful in explaining some of the principles of the present invention.

Figure 6:
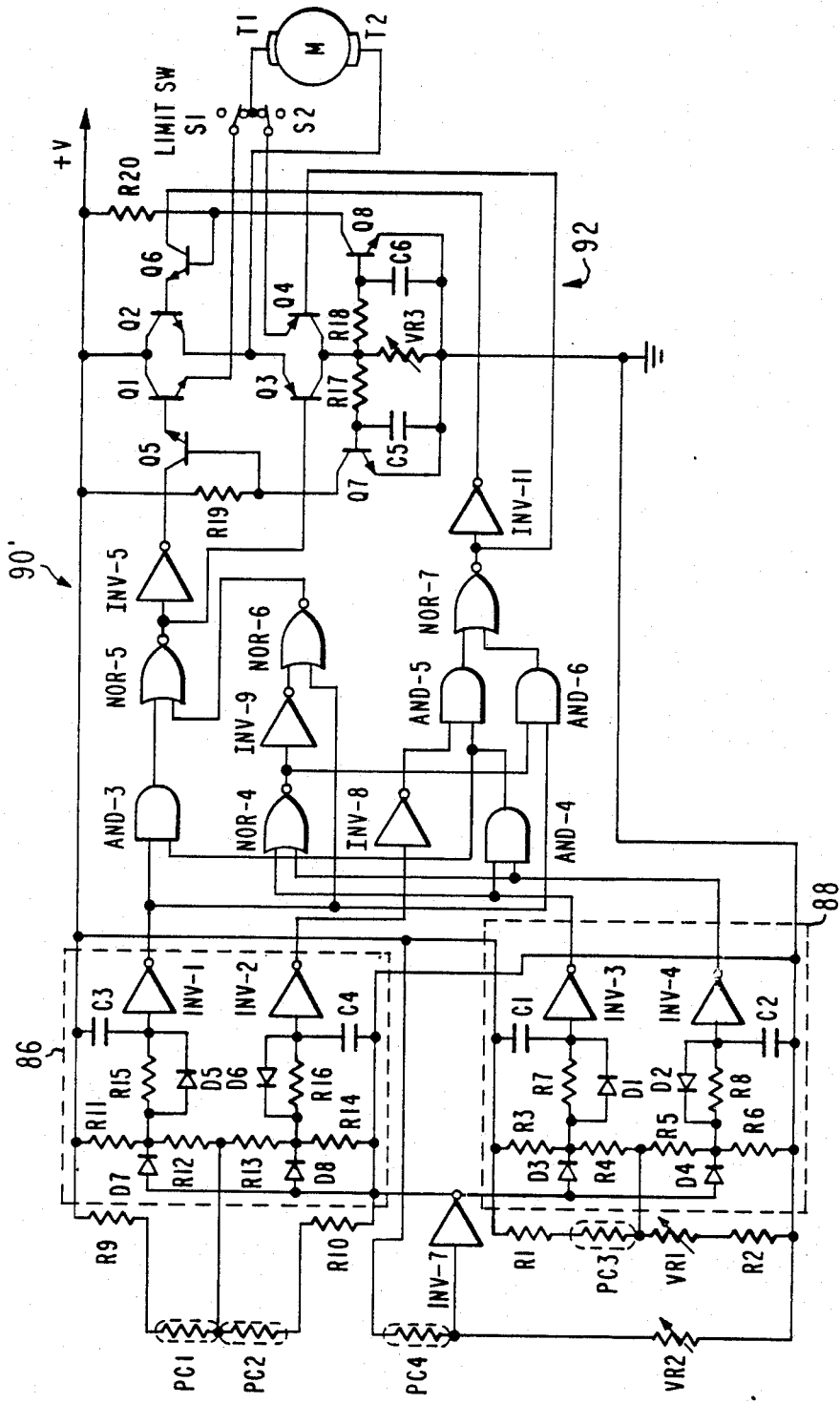
FIG. 6 is a schematic circuit diagram of a second embodiment of the present invention.

In FIG. 1, a skylight 10, which may include either a transparent of translucent dome 12, is mounted on a roof 14 of a building for passing sun rays 15 into the building interior 16. Shutter 18 comprises a plurality of slats 20 rotatable about parallel axes 22. Shutter 18 may be of any conventional construction and may be constructed similar to the shutter construction disclosed in the aforementioned U.S. Pat. No. 4,435,920.

A portion of the structure of that patent, as illustrated in FIG. 2 thereof, is partially illustrated in FIG. 2 of this specification. The details of the construction and operation of the complete shutter of FIG. 2 herein is similar to that of the patent.

Shutter 18 is controlled automatically by an electronic control system embodied in the circuit of FIG. 4. Photoresistors PC1 and PC2 are attached to the shutter 18 for rotation about an axis 21 parallel to axes 22, as will be described in more detail below. The photoresistors PC1, PC2, and PC4 are positioned beneath the dome 12, FIG. 1, to receive the sun rays 15 directly without passing through the shutter 18. A fourth photoresistor PC3 is located beneath the shutter 18 to sense the light passed through and controlled by the shutter 18. PC3 and PC4 are secured in fixed relation relative to the shutter 18, for example, they may be fixed (by means not shown) to the shutter frame 23 secured to roof 14.

The circuit of FIG. 4 operates on motor M which may be D.C. powered and which selectively opens and closes the slats 20, FIG. 1. The slats are opened or closed in accordance with the intensity of light, rays 15, impinging on the photoresistors PC1–PC4. The opening and closing of the slats depends, in part, on the relative direction of the light to the orientation of the slats 20, as will be shown below. The broad surfaces of the slats are positioned generally parallel to the sun's rays 15 to pass maximum light. The photoresistors PC1 and PC2 and the circuit of FIG. 4 operate as a sun tracking system to place and maintain the slats in the maximum light passing state as the sun traverses through the sky in the diurnal cycle.

The control system operates motor M to close the shutter 18, that is, to cause the broad surfaces of slats 20 to be more normal to the sun's rays or until they overlap at their edges at the maximum closed position, if desired, when the intensity of light incident on PC3 exceeds a given predetermined settable threshold level. Conversely, the control system operates motor M to open the shutter, i.e., orient the slats' broad surfaces more parallel to the sun's rays, when the intensity of the incident light on PC3 decreases below the predetermined settable threshold level. That threshold level is settable to any light intensity value which may be less than the intensity level incident on PC1 and PC2. In that case, the circuit of FIG. 4 causes the motor M to respond to the level of the light intensity sensed by PC3 and override the level of light sensed by PC1 and PC2 to close the shutters and thus aim the shutters in a direction different than that tended to be aimed by PC1 and PC2.

Photoresistor PC4 senses when the incident light decreases below that level indicating the oncoming evening hours, i.e., night. For example, the level of intensity of light sensed by the photoresistor PC4 may be 10 lux or less. When this occurs, the circuit of FIG. 4 including PC4 automatically overrides the effects of PC1, PC2, and PC3 and generates a signal to close the shutter 18 with the slats 20 overlapping. In the latter case, the shutter 18 is fully closed to forestall loss of heat from the building interior 16 by radiation through the dome 12 to conserve energy.

Photoresistors PC1–PC4 are devices whose respective resistances vary inversely with the light intensity incident on the devices. The photoresistors PC1 and PC2 may be identical in this embodiment. PC1–PC4 may be cadmium sulfide (CdS) and may each have a resistance of about 10 megohms when the sensed illumination is about 10 lux and a resistance of about 10 K ohms when the sensed illumination is about 7 K lux. The variable resistances of VR1 and VR2 have a value which can be adjusted anywhere within the range of values of the corresponding respective resistances of PC3 and PC4 associated therewith.

In FIG. 2, slats 20 (shown in phantom) are each secured to parallel drive mechanisms 26 and 28. The mechanism 26 includes a bracket 30 secured to the shutter frame 23 represented by symbol 32. Mechanism 28 bracket 34 is also secured to the shutter frame. The drive mechanism 26, which is partially illustrated in FIG. 2, comprises two parallel connecting links 38 and 40 and two rotating links 36 at opposite ends of links 38 and 40 (only one rotating link is shown). Link 36 is pivotally secured to bracket 30. Links 38 and 40 are pivotally connected at their respective ends to the rotating links 36. Rotation of link 36 in directions 42 about axis 21 moves the links 38 and 40 in a known way.

A plurality of equally spaced bearing apertures (not shown) are formed in the links 38 and 40. The apertures in the links 38 and 40 are aligned in a direction parallel to the length dimension of link 36. Rotation of the link 36 in directions 42 about its axis of rotation 21 rotates the aligned apertures about their corresponding axes 22 of rotation parallel to axis 21. This is all described more fully in the aforementioned U.S. Pat. No. 4,435,920.

The drive mechanism 28 is constructed similarly as the mechanism 26. Rotating links 46 (only one being shown) correspond to and have identically spaced pivots as links 36. Links 48 and 50 correspond, respectively, to and have identically spaced bearing apertures and pivots as the links 38 and 40. The links 38, 40, 48, and 50 are parallel. Each pair of aligned bearing apertures in the links 48, 50 of mechanism 26 form an aperture set with a pair of aligned apertures of the mechanism 28 to support a slat.

The slats 20 are pivotally secured to the links 38, 40, 48, and 50 by relatively stiff wire brackets which, by way of example, may be piano wire. The wire ends extend from the brackets forming pivot pins which mate with the corresponding bearing apertures (not shown) in the links 38, 40, 48, 50. The above structure is described in more detail in the aforementioned U.S. Pat. No. 4,435,920.

A drive rod 52 connects link 36 to link 46. Rotation of the drive rod 52 in directions 42 about axis 21 rotates the links 36 and 46. Rotation of the links 36 and 46 moves the links 38, 40, 48, and 50 to rotate the slats 20 about their corresponding axes 22. A gear 54 is fixed to the drive rod 52 and mates with a worm gear 56, driven by motor M. Motor M is attached to a bracket 60 which is integral with fixed bracket 34. Motor M may be battery operated, as described in the aforementioned U.S. Pat. No. 4,396,831, or powered from an external source of power (not shown). The rotation of the worm gear 56 rotates the gear 54 thereby rotating rod 52. Rotation of the rod 52 rotates the links 36, 46 relative to the stationary brackets 30 and 34 secured to the shutter frame (not shown).

The photosensor structure 62, FIGS. 2 and 3, comprises a photosensor assembly 66 which is fixed to a support 64, which may be a rod. The support 64 is secured to drive rod 52 for rotation about axis 21 in directions 42. In FIG. 3, the photosensor assembly 66 includes sheet member 68 which is stiff and V-shaped having a leg 70 lying in one plane intersecting the plane of a second leg 72 at an angle $\beta$. Sheet member 68 is secured to the support rod 64. Photoresistor PC1 is secured to leg 70 and PC2 is secured to leg 72. Opaque tube 74 is secured to leg 70 closely encircling PC1 and a like opaque tube 76 is secured to leg 72 closely encircling PC2. Tube 74 is centered on axis 78 and tube 76 is centered on axis 80. Axes 78, 80 are orthogonal to the planes of legs 70 and 72. Axis 82, which bisects angle $\beta$, intersects axis 21.

The tubes 74 and 76 of photosensor structure 62, FIG. 3, increase the sensitivity of the photoresistors to their relative orientation to the direction of the sun's rays 15. For example, PC1 and PC2 may have a minimum resistance of about $10^5$ ohms each when their respective axes 78 and 80 are parallel to rays 15. Assuming angle $\beta$ is 120°, PC1 and PC2 can each have a high resistance of about $10^{7.7}$ ohms when the corresponding tube is oriented about 90° from that orientation. That increased resistance value decreases somewhat as the angle $\beta$ is made larger because, in this case, that photoresistor is aimed more toward the sun.

In operation of the system of FIGS. 2 and 3, assume the motor M is energized, rotating the worm gear 56, rotating the drive rod 52 via gear 54. This rotates the links 36, 46 in one of directions 42. In turn, the links 38, 40, 48, and 50 are caused to move in the corresponding directions. The connection of the links 38, 40, 48, and 50 rotate slats 20 about axes 22 parallel to the rod 52 axis 21, directions 42. The slats can therefore be rotated from a full closed position, to a full open position, to a full closed position in the opposite direction. The slats 20, shown in phantom in FIG. 2, are illustrated fully opened. The rotation of rod 52 thus rotates the photosensor assembly 66 axis 82 about axis 21, FIGS. 2 and 3, in synchronism with and parallel to the rotation of slats 20 in directions 42.

The assembly 66 is secured to the rod 52, FIG. 2, such that the axis 82 is parallel to the generally broad surfaces of the slats 20. The slats 20, therefore, pass a maximum amount of incident light when the light rays are parallel to axis 82, i.e., when axis 82 intersects the light source. Since legs 70, 72, and thus the photoresistor axes 78, 80, FIG. 3, are at equal angles relative to central axis 82, and assuming the sun's rays 15 are incident on the photoresistors PC1 and PC2 in a direction parallel to axis 82, it is evident that the relative values of the resistances of PC1 and PC2 at this time are about the same.

Should the photosensor assembly 66, FIGS. 2 and 3, be rotated in one of directions 42 so that the sun's rays are nonparallel to axis 82, one of PC1 and PC2 will receive more light than the other. At this point their resistances will be unequal, indicating that the slats 20 are in an orientation which will pass less than maximum incident light. In this way, the relative values of the resistances of PC1 and PC2 are unequal and provide an indication of the relative orientation of the slats 20 to the direction of the incident light rays 15. The photoresistors PC1 and PC2 are used to track incident radiation. However, recall that the solar tracking signal provided by the circuitry of FIG. 4 associated with PC1 and PC2 can be overridden by certain signals in cooperation with signals created by photoresistors PC3 or PC4, as will be explained.

Certain portions of the circuit of FIG. 4 find correspondence with similar circuitry in the aforementioned U.S. Pat. No. 4,396,831. The description of those portions of the circuit are made in more detail in that patent and, therefore, will not be repeated herein.

In FIG. 4, photoresistors PC1 and PC2 are serially connected through current limiting resistor R9 to a positive D.C. voltage source +V and through current limiting resistor R10 to system ground to form a voltage divider. The node between PC1 and PC2 is connected to a point between resistors R12 and R13. Photoresistor PC3 and variable resistance VR1 are serially connected to +V through current limiting resistance R1 and to system ground through current limiting resistance R2. The node between PC3 and VR1 is connected to a point between resistances R4 and R5. Photoresistor PC4 is serially connected with variable resistance VR2 between +V and system ground.

The circuitry within the dashed line 86 including inverters INV-1 and INV-2 corresponds generally to similarly placed components in the circuit of the aforementioned U.S. Pat. No. 4,396,831, FIG. 2. For example, resistor R11 of FIG. 4 corresponds to resistor R1 of the patent, capacitor C3 corresponds to capacitor C1, resistor R15 corresponds to resistor R5, and diodes D7 and D5 correspond to diodes D4 and D2, respectively, and so forth.

The operation of the circuit enclosed within the dashed line 86 of FIG. 4 is, therefore, somewhat similar to that explained more fully in the aformentioned patent for similar components. However, PC2, FIG. 4 herein, is a sensor resistance, whereas resistance RB of the patent is manually settable. In practice, both are variable. Other differences include the addition of the current limiting resistances R9 and R10 in the FIG. 4 circuit but generally referred to in the patent. In any event, the circuit in dashed line 86 serves to provide certain logical levels at the outputs of inverters INV-1 and INV-2 according to the relative values of the resistances of PC1 and PC2, as will be explained more fully below in connection with Table 1.

The circuitry shown in dashed line 88, FIG. 4, as can be ascertained by comparison to the circuitry of dashed line 86, is similar to it both physically and operationally. That is, the circuit in dashed line 88 serves to provide certain logical levels at the outputs of inverters INV-3 and INV-4 according to the relative values of the resistances of PC3 and VR1. This will also be more fully explained below in connection with Table 1.

A node between PC4 and VR2 is coupled through an inverter INV-7 to the anodes of diodes D7, D8, D3, and D4. Photoresistor PC4 and inverter INV-7 serve to provide an override signal for closing the shutters when the incident radiation on PC4 is below a given threshold, for example, at night. A similar function is described more fully in the aforementioned U.S. Pat. No. 4,396,831. These latter elements find correspondence with the photoresistor PC2 and INV-5 of FIG. 2 of that patent.

TABLE 1

| Relative Resistance Values of PC1 and PC2 | Output INV-1 | Output INV-2 | Relative Resistance Values of PC3 and VR1 | Output INV-3 | Output INV-4 | Motor M (Direction) | Shutter Action |
|---|---|---|---|---|---|---|---|
| PC1 < PC2 | L | L | PC3 < VR1 | L | L | CW | Close |
|  | L | L | PC3 ≈ VR1 | L | H | Stop | Hold |
|  | L | L | PC3 > VR1 | H | H | CW | Open |
| PC1 ≈ PC2 | L | H | PC3 < VR1 | L | L | CW | Close |
|  | L | H | PC3 ≈ VR1 | L | H | Stop | Hold |
|  | L | H | PC3 > VR1 | H | H | Stop | Hold |
| PC1 > PC2 | H | H | PC3 < VR1 | L | L | CW | Close |
|  | H | H | PC3 ≈ VR1 | L | H | Stop | Hold |
|  | H | H | PC3 > VR1 | H | H | CCW | Open |

The outputs of inverters INV-1–INV-4 are logical ones (high-H) or zeros (low-L). The output states of INV-1 and INV-2 are determined by the relative value of the resistance of PC1 and PC2. The output states of INV-3 and INV-4 are determined by the relative values of the resistances PC3 and VR1.

In Table 1 the outputs of INV-1–INV-4 are shown for different relative resistance values of PC1, PC2, VR1, and PC3. When the resistance of PC1 is less than the resistance of PC2, that is, more light is incident on PC1 than PC2, it can be shown that the outputs of INV-1 and INV-2 are both low (L). At this time, the slats 20, FIG. 1, are positioned with their broad surfaces nonparallel to rays 15 and pass less than a maximum amount of incident sunlight. Axis 82 of PC1, PC2, FIGS. 1 and 3, is nonparallel to the rays 15 and PC1 is aimed in a direction more toward the sun than PC2. That is, in FIG. 1, the broad surfaces of the slats 20 are counterclockwise (CCW) of their parallel orientation relative to that of the sun rays 15. To change the slats' 20 orientation to pass maximum incident light would require rotation of the slats in the clockwise (CW) direction. To decrease the amount of light, the slats in this embodiment are also rotated in the CW direction. When moved in the CW direction, the slats are moved past the increased light position until the light decreases and are continued to be moved until the desired decreased light level is reached. If the temporary increase of light during closing is undesirable, in the alternative, in a second embodiment, a circuit, FIG. 6, can be provided to move the slats in the CCW direction instead of the CW direction to immediately decrease the amount of passed light.

When the PC1 resistance, FIG. 4, is approximately the same as that of PC2, then the INV-1 output is low (L) and the output of INV-2 is high (H). The axis 82, FIGS. 1 and 3, is parallel to the sun's rays 15. The slats in this orientation thus pass a maximum amount of incident light.

When the value of PC1 is greater than that of PC2, the outputs of INV-1 and INV-2 are both high (H). Photoresistor PC2 is receiving more light than PC1. In this orientation, the broad surfaces of the slats 20 are clockwise (CW) of their parallel orientation relative to that of the sun's rays 15. To change the slats' 20 orientation to pass maximum light now requires rotation of the slats in the CCW direction. This is opposite in direction to the direction to increase the passed light when PC1 receives more light than PC2. To reduce the amount of passed light, the slats are moved further CW.

The circuit of FIG. 4 can issue these different commands and recognizes when to rotate the slats CCW or CW to increase or decrease the passed light. That is, the circuit is responsive to the two low (L) conditions of the respective INV-1 and INV-2 outputs to move the slats CW to open them and to the two high (H) conditions to move the slats CCW to open them. In the prior art, an "open" command meant moving the slats only in a given direction. As a result, the present structure permits the slats to be placed in any orientation relative to the sun and still cause the slats to "open" in the correct direction.

The resistance of VR1 is variable to manually set the desired illumination intensity to be passed through the shutter 18. For a given illumination, PC3 has a given resistance between its limits. Motor M has its operating shaft connected to the shutter 18 as represented by the dashed line 89, FIG. 1. When the slats 20 are moved, the light intensity on PC3 varies accordingly and this, in turn, alters the resistance value of PC3. When the value of the PC3 resistance approaches the value of the resistance of VR1, the input to INV-3 will be above its threshold level and the input of INV-4 will be below its threshold level. This results in the output of INV-3 being a low and the output of INV-4 being high as shown in Table 1. It can be shown that when the value of the resistance of PC3 is less than that of VR1, the outputs of INV-3 and INV-4 are both low whereas when the resistance PC3 is greater than VR1, the outputs of INV-3 and INV-4 are both high.

Because of the circuit configuration, there is no state in which the output of INV-1 and INV-3 are "high," while the output of the INV-2 and INV-4 are "low." Therefore, such impossible combinations are not included in Table 1. The inverters INV-1–INV-4 are Schmitt triggers which switch at different points for positive-going and negative-going signals. Therefore, there will be some finite difference between the resistance values of PC1, PC2, or PC3 and VR1 when the circuit provides "stop" signals. The symbol ≅ of Table 1 refers to those situations.

Logic circuit 90, FIG. 4, couples the inverters INV-1–INV-4 through a transistor switching circuit 92 to motor M. If the outputs of INV-1–INV-4 are A, B, C, and D, respectively, and assuming the combination of their outputs have 4-bit information, the Boolean algebra equation for the operating criteria of "open," "close," and "stop" in the circuit of FIG. 4 can be expressed as follows:

"open" is when:

$$A \times B \times C \times D = 1 \qquad (1)$$

"close" is when:

$$\{\overline{(A+B)} + \overline{(C+D)}\} \times (C \times D) = 1 \qquad (2)$$

"stop" is when:

both of the above "open" and "close" equations are zero. $\qquad (3)$

Logic circuit 90 comprises an AND gate, AND-1, whose inputs are supplied from INV-1–INV-4 and whose output is applied to the collector of NPN transistor Q5 and through inverter INV-5 to the base of PNP transistor Q3. The INV-1 and INV-2 outputs are also supplied as inputs to a NOR gate, NOR-1, whose output is applied as one input to AND gate, AND-2. The outputs of INV-3 and INV-4 are applied as second and third inputs to AND-2 and as an input to a NOR gate, NOR-2. The outputs of AND-2 and NOR-2 are applied as inputs to NOR gate, NOR-3, whose output is applied to the base of PNP transistor Q4 and through inverter INV-6 to the collector of NPN transistor Q6.

The positive voltage +V is coupled through current limiting resistor R19 through the collector-emitter path of NPN transistor Q7 to system ground and through current limiting resistor R20 and the collector-emitter path of NPN transistor Q8 to system ground. Positive voltage +V is coupled through the collector-emitter path of NPN transistor Q1 and through switch S1 to the terminal T1 of motor M. Positive voltage +V is coupled through the collector-emitter path of NPN transistor Q2 to motor M terminal T2 and through the emitter-collector path of transistor Q3 through variable current limiting resistance VR3 to system ground. Terminal T1 of the motor M is connected through serially connected switch S2, the emitter-collector path of PNP transistor Q4, and the variable resistance VR3 to system ground. The base electrode of Q5 is connected to a point between resistance R19 and the collector of Q7. The base electrode of Q6 is connected to a point between R20 and the collector of Q8. The base electrode of Q2 is connected to the emitter of Q6. The base electrode of Q7 is coupled to system ground through filtering capacitor C5 and through serially-connected current limiting resistances R17 and VR3. The base electrode of Q8 is coupled to system ground through filtering capacitor C6 and through serially-connected current limiting resistances R18 and VR3.

The truth table for the Boolean equations (1), (2), (3), above is shown in Table 1. The circuit of FIG. 4 does several things. The variable resistance VR1 sets the desired level of light intensity in the interior 16. This can be done by adjusting the value of VR1 on a bright day until the desired light intensity is reached. This can also be accomplished by a calibration scale (not shown). In any case, the outputs of inverters INV-3 and INV-4 have either high or low levels according to the relative values of the resistance of PC3 to VR1. The resistance of PC3 approaches that of VR1 at the desired light intensity. Therefore, at that time the motor M should stop. This occurs when the INV-3 output is low and the INV-4 output is high. When the resistance of PC3 is less than the resistance of VR1, the light intensity passed by the shutter 18 is too high and should be reduced. This requires action by motor M to "close" the shutter 18 to reduce the light passed. Conversely, when the value of PC3 is greater than that of VR1, the light level in interior 16 is too low and the shutters should be positioned to allow more light to pass therethrough.

However, PC1 and PC2 permit the slats 20 to track the sun to provide maximum light when that condition is desired by the relative settings of PC3 and VR1. The greater the value of the PC3 resistance to that of the VR1 resistance, the more the circuit will attempt to drive the motor to open the slats 20. When maximum light is desired, the shutter slats 20 should not be moved past the point at which the maximum light is being passed. The shutter should be stopped when the axis 82 of the photoresistor assembly 66 and thus the slats 20 are parallel to the sun's rays. When that condition is reached, PC1≅PC2, even though the value of the PC3 resistance is greater than the VR1 resistance, the motor stops because the circuit interprets the light passed through the shutter is a maximum. Observe in Table 1 that in the condition where PC1≅PC2 and PC3>VR1, the motor is stopped and the shutter is held in position. By setting the value of VR1 to a low minimum value, maximum light through the shutter is ensured.

When that maximum light passed through the shutters is more than desired, then the value of PC3 should be less than that of VR1. Even though PC1 and PC2 are about the same value, PC3 being less than VR1 will create a set of signals which cause the logic circuit 90 to override the set of signals produced by the PC1 and PC2 sensors to move the shutters to reduce the amount of light passed therethrough. This is shown in Table 1 by the clockwise (CW) direction of the motor which closes the shutter for this condition.

When the value of PC1 is less than that of PC2, this indicates that the maximum light being passed by the shutters has not been reached. This also indicates which direction the shutter should be moved to increase the amount of passed light. However, the relative values of PC3 and VR1 are employed to indicate whether or not to actually move the shutters in accordance with the desired light intensity to be passed by the shutter. For example, even though the value of PC1 is less than that of PC2, indicating maximum light is not being passed, it might be that this light intensity is too high and the shutter should be closed even further. In this case, PC3 will have a value which is less than VR1 which will create signals which cause the motor to move in the CW direction and close the shutter (while temporarily increasing the light in the embodiment of FIG. 4, as discussed above). The shutter will continue to be closed until PC3 is approximately the same as VR1 at which time the motor will stop.

Assume, however, that the condition of the resistance PC1 being less than the resistance of PC2 provides insufficient light and more light is desired. That is, the PC3 resistance is greater than the VR1 resistance. This requires the motor to open the shutter. As can be seen from Table 1, under these set of conditions, the motor moves in the CW direction but will open the shutter and will not stop until PC3≅VR1 or PC1≅PC2 which ever occurs first. The motor thus, in this embodiment, can move the shutter in the same direction, CW, to both close and open the shutter to respectively decrease and increase the amount of light passed therethrough.

For example, in FIG. 5, assuming the light rays 15 are coming from the direction shown, and the slats 20 are oriented as shown, photoresistor PC1 is aimed in a direction more toward the light than PC2 so that the resistance of PC1 is lower than that of PC2. If the PC3 resistance is greater than the VR1 resistance, this indicates more light is needed. To increase the amount of light passed by the shutter 18, the slats need be rotated in the CW direction. This will open the shutters to pass more light (move PC2 more toward facing the light).

Now, assume VR1 has a resistance greater than the resistance of PC3, this indicates too much light is entering past slats 20. The resistance of PC1 still indicates more light than that of PC2. It is desired to therefore close the shutters to reduce the light until the value of PC3 matches that of VR1. In this case, the slats of the shutter 18 will be moved in the CW direction to close the shutters. It will occur that upon examination of FIG. 5 that the shutters may be moved in this instance through a position in which the actual amount of light passed thereby will increase. However, because the relative resistance values of PC3 to VR1 remains unchanged, i.e., VR1 remains greater than PC3, the shutters will continue to rotate in the CW direction past that point of maximum incident light to again reduce the amount of light passed by the shutters. The shutters will continue to move until the PC3 resistance matches that of VR1.

By observation of Table 1, it is seen that as long as the value of the PC3 resistance remains lower than that of VR1, the set of signals provided by the INV-3, INV-4 outputs will remain low and the motor will continue to operate in the CW direction to close the shutter and decrease the passed light intensity. Thus, in this condition, the motor M is operated in the CW direction to both increase the light and decrease the light passed by the shutter 16.

In operation of the circuit of FIG. 4, by way of example, assume the resistance value of PC1 is less than PC2, indicating greater light incident on PC1, and the value of PC3 is greater than that of VR1, indicating insufficient light in the interior room 16, FIG. 1. The set of signals comprising the outputs of INV-1 and INV-2 are both low. The set of signals comprising the outputs of INV-3 and INV-4 are both high. The output of AND-1 is low, NOR-1 is high, NOR-2 is low, AND-2 is high, NOR-3 is low, and the outputs of INV-5 and INV-6 are high. The low output on AND-1 cuts off Q1. The high output of INV-5 cuts off Q3. The low output of NOR-3 turns on Q4 and the high output of INV-6 turns on Q2 through Q6. Therefore, current is conducted through Q2, from terminal T2 of D.C. motor M to terminal T1, to switch S2 through Q4 through current limiting resistor VR3 to system ground).

Switches S1 and S2 are limit switches which are activated by the shutter mechanism to stop the shutters when the shutters have reached some predetermined position, such as a fully closed position to prevent overdriving the shutters.

The application of D.C. power to motor M from terminal T2 to T1 moves the motor in the CW direction. It can be shown that when the INV-1–INV-4 outputs are all low, Q2 and Q4 will be in the closed conducting state and Q1 and Q3 will be in the open nonconductive state. This condition operates motor M in the same direction as just described. Similarly, when INV-1–INV-4 are all high, it can be shown that Q1 and Q3 are conductive and Q2 and Q4 are nonconductive. This action supplies power in the reverse direction, that is, D.C. power is supplied from terminal T1 to terminal T2 through motor M. The motor now operates in the CCW direction. It also can be shown that when the output of AND-1 is high and the output of INV-6 is low, transistors Q1 and Q3 are conductive and the shutter opens. When AND-1 is low and the output of INV-6 is high transistors Q2 and Q4 are conductive and the motor moves the shutter in the CW closing direction.

PC4 and INV-7 and the corresponding circuitry generate a set of signals which cause motor M to close the shutter when the evening hours approach, that is, when the level of incident sunlight goes below a predetermined threshold, for example, 10 lux. More particularly, when the value of the resistance of PC4 increases to that predetermined level representing night, the output of INV-7 becomes high and the set of signals comprising the outputs of INV-1–INV-4 all go low. As discussed above, motor M is powered from terminal T2 to T1 through transistors Q2 and Q4, closing the shutters.

Because relays and delay relays are not employed, and because Schmitt trigger circuits are employed to operate the transistors which therefore do not require a biasing circuit, relatively low power consumption is required by this circuit. The voltage +V may be supplied by conventional penlight batteries (type AA).

In FIG. 6, logic circuit 90' may replace the logic circuit 90 of FIG. 4. The logic elements including AND gates AND-3–AND-6, NOR gates NOR-4–NOR-6, and inverters INV-8–INV-11 operate in the normal way in response to the applied input signals. The purpose of circuit 90' is to change the direction of rotation of the slats so that when the condition PC1<PC2 and PC3<VR1 is present requiring less light to be passed by the slats 20, the slats are closed in the CCW direction, FIG. 1, immediately decreasing the amount of light passed. This avoids temporarily increasing such passed light as occurs with the circuit of FIG. 4, if that is undesirable.

The Boolean algebra equation for the operating criteria of "CCW," "CW" and "Stop" for the circuit of FIG. 6 can be expressed as follows, assuming that the outputs of INV-1–INV-4 again are A-D, respectively:

"CCW" is when:

$$(A \cdot C \cdot D) + \overline{(C + D + A)} = 1 \quad (4)$$

"CW" is when:

$$(C \cdot D \cdot \overline{B}) + \overline{(C+D)}A = 1 \quad (5)$$

"Stop" is when:

both of the above "CCW" and "CW" equations are zero. (6)

The truth table can be shown to be the same as presented in Table 1 except that the motor M direction for the conditions PC1<PC2; PC3<VR1 and PC1≃PC2; PC3<VR1 is CCW instead of CW. Thus, in Table 1 as modified by the circuit of FIG. 6, when PC1<PC2 and PC3<VR1, motor M moves CCW in the close condition. Examination of FIG. 1 shows that such CCW motion moves the slats 20 more normal to the sun's rays 15 immediately reducing the amount of light passed.

In the case of PC1≃PC2 and PC3<VR1, the motor M moves CCW instead of CW in the circuit 90, Table 1. This change of direction does not matter as the shutters in this condition are initially oriented parallel to the sun's rays 15 and rotation of the slats in either CW or CCW directions will immediately reduce the amount of passed light.

We claim:

1. A shutter light controlling system for use with a shutter having a plurality of light passing orientations in which the light to be controlled from a source is incident on and passes through the shutter, said shutter tending to pass said light to be controlled at different intensities according to the light passing orientation of the shutter relative to the source, said system comprising:
   drive means adapted to place said shutter in a given light passing orientation in response to an applied drive input signal;
   first control means responsive to the light to be controlled for generating a first drive means input signal to place the shutter in a first orientation at which the intensity of the light passed by said shutter is a maximum; and
   second control means responsive to the intensity of the light passed by said shutter for generating a second drive means input signal for overriding said first input signal to place the shutter at a second orientation at which the intensity of light passed by said shutter is at any selected value less than said maximum.

2. The system of claim 1 further including third control means responsive to the light to be controlled for generating a third drive means input signal to override said first and second signals and place said shutter in a third orientation to close the shutter when the intensity of light to be controlled is below a given threshold.

3. The system of claim 1 wherein said first and second control means includes means for generating said first and second input signals having values at which said drive means moves said shutter in the same relative direction to either increase or decrease the selected intensity of said light passed by said shutter when the light to be controlled is in a given orientation relative to said shutter.

4. The system of claim 1 wherein said light source to be controlled has different positions relative to the shutter such that a given motion of the shutter may either increase or decrease the passed light intensity accordingly, said first and second control means includes means for generating said first and second signals at values which cause said drive means to move said shutter in selected opposite directions to increase the intensity of light passed by said shutter in accordance with the relative orientation of the shutter to the light to be controlled.

5. The system of claim 1 wherein said shutter has a plurality of slats rotatable about parallel axes, said first control means includes first and second photosensors adapted to be secured to said shutter slats for rotation about an axis parallel to said slat axes and for indicating the relative orientation of said slats to said light to be controlled.

6. A shutter light controlling system comprising:
   drive means for placing the shutter in a given light passing state in response to an applied drive input signal;
   first sensor means for generating a first set of output signals manifesting the light passing state of said shutter;
   second sensor means for generating a second set of output signals manifesting the intensity of light passed by said shutter relative to any selected intensity; and circuit means responsive to said first and second sets of output signals for producing a first drive input signal to place said shutter in that light passing state at which the intensity of light passed by said shutter is at said selected intensity.

7. The system of claim 6 further including third sensor means for generating a third set of output signals when the light to be controlled has a level below a given threshold, said circuit means including means responsive to said third set of output signals for producing a second drive input signal to override said first drive input signal and close the shutter.

8. The system of claim 6 wherein each said set of output signals comprises a pair of signals having first and second values, said circuit means including means responsive to said first and second values of each said set of signals for generating a second drive input signal having a third value for changing the shutter states in one direction to either increase or decrease the intensity of passed light to match said selected intensity in accordance with the said first and second signal values and for generating a third drive input signal having a fourth value for changing the shutter states in a second direction to increase the intensity of the passed light to match said selected intensity.

9. The system of claim 6 wherein said sets of signals each have first and second values, said circuit means including logic means responsive to said first and second values for generating a pair of output switch control signals and switch means responsive to said output switch control signals applied as an input for generating said first drive input signal.

10. A shutter light controlling system comprising:

drive means adapted for placing said shutter in a given light passing state in response to an applied drive input signal, said state having a range of values from a minimum to a maximum light passing value;

first control means adapted to be attached to said shutter for generating said drive input signal having a first value for placing said shutter in the maximum light passing state; and second control means responsive to the intensity of light passed by said shutter for generating a second drive means input signal having a second value for opening the shutter in response to a decrease in intensity of light passed by the shutter below any selected threshold light intensity value, said second drive means input signal overriding said first drive means input signal to place said shutter in the state corresponding to said selected threshold value when said selected threshold value is less than the intensity of the maximum passed light, and a third drive means input signal having a third value for overriding said first drive means input signal to close the shutter in response to an increase in intensity of light passed by the shutter above said selected threshold light intensity value to thereby maintain said selected threshold value.

11. The system of claim 10 further including third control means responsive to the intensity of said light to be controlled for generating a fourth drive means input signal to close the shutter when the light to be controlled has an intensity below a given threshold value, said fourth drive means input signal overriding said first, second, and third drive means input signals.

12. A shutter sunlight controlling system, said shutter including a plurality of parallel rotatable slats which overlap at their edges in the closed state and are rotatable about parallel axes to place them in the open state, said system comprising:

drive means adapted to place said slats in a given light passing state in response to an applied drive input signal;

first control means including solar tracking means adapted to be attached to said shutter for providing a first drive means input signal to orient the slats so that the light passed by the slats is a maximum; and second control means including settable light threshold means responsive to the light passed by said slats for providing a second drive means input signal, said second signal overriding the first input signal to place the slats in a light passing state at which the intensity of light passed by said slats is at any selected value less than said maximum.

13. The system of claim 12 further including third control means including a settable light threshold means responsive to the light to be controlled for providing a third drive means input signal for overriding said first and second drive means input signals to close the slats when the intensity of the light to be controlled is below a given threshold.

* * * * *